United States Patent [19]

Drent

[11] Patent Number: 4,904,759
[45] Date of Patent: Feb. 27, 1990

[54] LINEAR ALTERNATING POLYMER OF CARBON MONOXIDE, OLEFIN AND CONJUGATED DIOLEFIN

[75] Inventor: Eit Drent, Amsterdam, Netherlands

[73] Assignee: Shell Oil Company, Houston, Tex.

[21] Appl. No.: 266,189

[22] Filed: Nov. 2, 1988

[30] Foreign Application Priority Data

Nov. 2, 1987 [NL] Netherlands ............... 8702609

[51] Int. Cl.$^4$ .................................. C08G 67/02
[52] U.S. Cl. ........................................ 528/392
[58] Field of Search ............................... 528/392

[56] References Cited

U.S. PATENT DOCUMENTS

| | | | |
|---|---|---|---|
| 2,495,286 | 1/1950 | Brubaker | 528/392 |
| 3,689,460 | 9/1972 | Nozaki | 528/392 |
| 3,694,412 | 9/1972 | Nozaki | 260/63 CQ |
| 3,835,123 | 9/1974 | Nozaki | 260/949 B |
| 3,984,388 | 10/1976 | Shryne et al. | 528/392 |
| 4,024,325 | 5/1977 | Hudgin | 528/392 |
| 4,740,625 | 4/1988 | Drent | 568/387 |
| 4,788,279 | 11/1988 | Drent | 528/392 |

FOREIGN PATENT DOCUMENTS

| | | |
|---|---|---|
| 121965 | 10/1984 | European Pat. Off. . |
| 181014 | 5/1986 | European Pat. Off. . |
| 222454 | 5/1987 | European Pat. Off. . |
| 229408 | 7/1987 | European Pat. Off. . |
| 257663 | 3/1988 | European Pat. Off. . |
| 20469 | 2/1968 | Japan . |
| 1081304 | 8/1967 | United Kingdom . |

OTHER PUBLICATIONS

J. Mol. Catal. 1983, 18, 117–25.
Polym. Lett. 1965, 3, 703–7.
Chim. Ind. 1971, 53, 939–40.

Primary Examiner—Harold D. Anderson
Attorney, Agent, or Firm—Dean F. Vance

[57] ABSTRACT

Contacting carbon monoxide, at lease one α-olefin, and at least one conjugated diene in the presence of a catalyst composition formed by contacting a palladium compound, the anion of an acid having a pKa less than 6 and a bidentate phosphorus or nitrogen ligand results in the production of novel polyketone terpolymers.

20 Claims, No Drawings

LINEAR ALTERNATING POLYMER OF CARBON MONOXIDE, OLEFIN AND CONJUGATED DIOLEFIN

This invention relates to novel alternating polymers of carbon monoxide with one or more α-olefins and with one or more other olefinically unsaturated compounds.

Polymers of carbon monoxide and one or more ethylenically unsaturated hydrocarbons are well known. Such polymers contain carbonyl groups in the polymer backbone and are known as polyketones. The polymers are useful in part because at least a portion of the carbonyl groups can be converted by conventional chemical reactions into other functional groups, e.g., conversion into polyamines by reaction with ammonia and conversion into polyols by catalytic hydrogenation. The polyketone polymers independently have utility as will be described.

The carbon monoxide polymers produced by polymerization of carbon monoxide and ethylenically unsaturated hydrocarbons such as ethylene are generally high molecular weight linear alternating polymers having one unit of carbon monoxide per unit of hydrocarbon. The polymers are typically produced employing a catalyst comprising certain Group VIII metal compounds, e.g., a palladium compound, an anion of an acid with a pKa less than 4, and either a bidentate phosphorus ligand or a bidentate nitrogen ligand having certain structural requirements. When the olefinically unsaturated hydrocarbon is ethylene, the polymers are inexpensive and provide good mechanical properties of strength, stiffness and impact resistance.

The olefin-carbon monoxide copolymers include carbonyl groups as functional groups. At least part of these carbonyl groups can be converted into other functional groups by means of chemical reaction. This chemical modification leads to changes in the polymer properties which can increase the uses for the polymer.

It would be of advantage, however, to provide carbon monoxide polymers and a process for their production which introduce olefinically unsaturated double bonds into the polymer backbone, with the object of promoting crosslinking or further chemical modification by addition reactions at the double bonds. As a result of various side reactions that cause branching of the polymers, the double bonds are not suitably introduced by catalytic hydrogenation of the carbonyl groups into hydroxyl groups and catalytic dehydration of the hydroxyl groups to double bonds.

SUMMARY OF THE INVENTION

The present invention relates to certain novel polymers and to a process of producing the polymers. More particularly, the polymers to which the invention relates are polymers of carbon monoxide, at least one α-olefin, and at least one conjugated diene. The polymers are linear alternating polymers of carbon monoxide with other monomers, the polymers having primarily units of the type —(C=O)—(A)— wherein A is a polymer component resulting from polymerization of the α-olefin, and randomly distributed units of the type —(C=O)—(B)— wherein B is a polymer component having a carbon-carbon double bond and resulting from polymerization of the conjugated diene. In the polymers of the invention, there are on the average fewer than 1000 of the units —(C=O)—(A)— for each of the units —(C=O)—(B)— in the polymer molecules. Preferably there are fewer than 750 of the units containing component A for each unit containing component B, and more preferably fewer than 500.

Both polymer components A and B preferably contain less than 10 carbon atoms and preferably only one component A and one component B is used to produce the polymer. Preference is given to ethylene for producing component A and to butadiene for producing component B, resulting in a polymer having primarily units of —(C=O)—($C_2H_4$)— and randomly distributed units of —(C=O)—($C_4H_6$)— with the latter unit containing a carbon-carbon double bond as part of a functional group.

DESCRIPTION OF THE INVENTION

The polymers of the invention are linear alternating polymers of carbon monoxide with other monomers, the polymers having primarily units of the type —(C=O)—(A)— wherein A is a polymer component resulting from polymerization of the α-olefin, and randomly distributed units of the type —(C=O)—(B)— wherein B is a polymer component having a carbon-carbon double bond and resulting from polymerization of the conjugated diene. In the polymers of the invention, there are on the average fewer than 1000 of the units —(C=O)—(A)— for each of the units —(C=O)—(B)— in the polymer molecules. Preferably there are fewer than 750 of the units containing component A for each unit containing component B, and more preferably fewer than 500.

The α-olefins employed to produce the units containing component A have from 2 to 20, but preferably 2 to 10, carbon atoms inclusive. Useful α-olefins are ethylene, propylene, and 1-butene. Polymerization is most easily accomplished when a single α-olefin is employed and particularly useful is ethylene. The congugated dienes employed to provide the units containing component B have from 4 to 20 carbon atoms, preferably from 4 to 10 carbon atoms, inclusive. Useful conjugated dienes are butadiene, isoprene, chloroprene, and 1,3-hexadiene. Polymerization is most easily accomplished when a single conjugated diene is employed and particularly useful is butadiene.

In addition to carbonyl groups, the polymers of the invention include functional groups that contain carbon-carbon double bonds. These double bonds can be converted at least partly into other functional groups by means of chemical modification.

The process of the invention comprises contacting carbon monoxide, the α-olefin, and the conjugated diene in the presence of a catalyst composition formed by contacting a palladium compound, an anion of an acid having a pKa (determined in aqueous solution at 18° C.) less than 4, preferably less than 2, and particular phosphorus or nitrogen bidentate ligands.

The palladium compound employed in the catalyst compositions is a palladium salt and preferably a palladium carboxylate such as palladium acetate or propionate. The anion is an anion of an acid having a pKa less than about 4, such as mineral acids including perchloric acid, sulfuric acid, phosphoric acid, and nitrous acid, sulfonic acids including methanesulfonic acid, trifluoromethanesulfonic acid, 2-hydroxypropane-2-sulfonic acid, and para-toluenesulfonic acid, and carboxylic acids including trichloroacetic acid, dichloroacetic acid, trifluoroacetic acid, difluoroacetic acid, tartaric acid, and 2,5-dihydroxybenzoic acid. Anions of acids having a pKa less than 2 are preferred and in particular anions of sulfonic acids or carboxylic acids, such as para-toluenesulfonic acid or trifluoroacetic acid, respectively.

The anion is present in the catalyst composition in an amount from about 0.5 to about 200 equivalents per gram atom of palladium and preferably from about 1 to about 100 equivalents per gram atom of palladium. The anion is provided as the acid or as a salt of a non-noble transition metal such as zirconium, vanadium, chromium, iron, nickel, copper or zinc. When the anion is provided as the salt of a non-noble transition metal, a copper salt is prefered. Optionally, the palladium compound and the anion of the acid can be supplied as a single compound such as $Pd(CH_3CN)_2(O_3S-C_6H_4-CH_3)_2$ which is prepared by reaction of palladium chloride with the silver salt of para-toluenesulfonic acid in acetonitrile as the solvent or by reaction of palladium acetate and para-toluenesulfonic acid in acetonitrile as solvent.

The bidentate ligand useful as a catalyst composition component is selected from bidentate ligands of phosphorus and bidentate ligands of nitrogen. In the case of bidentate phosphorus ligands, suitable ligands are represented by the formula $$R^1R^2-P-R-P-R^3R^4$$

wherein $R^1$, $R^2$, $R^3$ and $R^4$ independently are organic radicals which may or may not be substituted with polar groups, but preferably are similar polar substituted groups with methoxyphenyl groups being most prefered. The group R is a divalent bridging group having at least two carbon atoms in the phosphorus-phosphorus bridge. The preferred R group is $-CH_2-CH_2-CH_2-$. Examples of suitable bidentate phosphorus ligands are
1,3-bis[di(4-methoxyphenyl)phosphino]propane,
1,3-bis[di(2-methoxyphenyl)phosphino]propane,
1,3-bis[di(2,4-dimethoxyphenyl)phosphino]propane,
1,3-bis[di(2,6-dimethoxyphenyl)phosphino]propane, and
1,3-bis[di(2,4,6-trimethoxyphenyl)phosphino]propane.

When a bidentate phosphorus ligand is used as the bidenate ligand of the catalyst composition it is an advantage for $R^1$, $R^2$, $R^3$ and $R^4$ to include at least one polar substituent in a position ortho to phosphorus. One advantage is that anions of acids having pKa's between 4 and 6 can be used. By preference, the phosphorus bidentate ligands are used in a quantity from about 0.1 to about 3 mol per mol of palladium compound, preferably from about 0.75 mol to about 2 mol per mol of palladium compound.

The bidentate nitrogen ligands useful in the invention are ligands of the formula

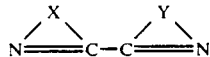

wherein X and Y independently are bridging groups of from 2 to 10 carbon atoms inclusive with from 3 to 4 atoms in the bridge, at least two of which are carbon atoms with any other atoms in the bridge being nitrogen atoms. In addition to the carbon-carbon connection shown in the formula, the bridging groups X and Y may also have a second linkage, as in the case of 1,10-phenanthroline and compounds derived therefrom. Preference is given to nitrogen bidentate ligands in which the bridging groups X and Y are similar. Illustrative classes of such bidentate nitrogen ligands are the 2,2'-bipyridines, the 1,10-phenanthrolines, the 2,2'-biquinilones, the 2(2-pyridyl)benzimidazoles and the 3-(2-pyridyl)-5,6-diphenyl-1,2,4-triazines. Illustrative derivatives of 2,2'-bipyridine are 4,4'-dimethyl-2,2'-bipyridine, 4,4'-dichloro-2,2'-bipyridine and 4,4'-dimethoxy-2,2'-bipyridine.

The preferred bidentate nitrogen ligands are 2,2'-bipyridine and 1,10-phenanthroline which are used in the catalyst composition in a quantity from about 0.5 mol to about 200 mol per mol of palladium compound, with quantities from about 1 mol to about 50 mol per mol of palladium compound being preferred.

It is preferred, but not required, to add a quinone to the catalyst composition to enhance catalyst activity. Useful quinones are 1,4-quinones, particularly 1,4-benzoquinones and 1,4-naphthoquinones.

The catalyst composition useful in the process of the invention is employed in quantities from about $1 \times 10^{-7}$ mol to about $1 \times 10^{-3}$ gram atom of palladium per mol of $\alpha$-olefin and conjugated diene are satisfactory with quantities containing from about $1 \times 10^{-6}$ to about $1 \times 10^{-4}$ gram atom of palladium per mol of the unsaturated hydrocarbons being preferred.

The method of contacting the catalyst composition and monomers is not critical and is conducted in the liquid phase in an inert solvent, in which the polymer is insoluble or virtually insoluble, or in a gaseous phase at polymerization conditions. Inert solvents include lower alcohols such as methanol and ethanol. The polymerization may be carried out either batchwise or continuous. In a typical polymerization, conditions employed include reaction temperatures from about 20° C. to about 200° C., preferably from about 30° C. to about 150° C. Typical reaction pressures vary from about 1 to about 200 bar, preferably from about 20 to about 100 bar. The carbon monoxide used in the polymerization may contain contaminants such as hydrogen, carbon dioxide, and nitrogen. The mechanical form of the reactor is not critical provided it maintains the desired polymerization conditions of temperature and pressure. Subsequent to polymerization, the terpolymer product is recovered by conventional means such as filtration or decantation.

The polymers of the invention have good mechanical properties. They are processed by conventional means into films, sheets, plates, fibers and molded objects. The polymers of relatively low molecular weight are useful in the production of plastics, as, for example, as components in blends with other hydrocarbon plastics useful in waxes and greases or plasticizers for other polymers. The higher molecular polymers have utility as premium grade thermoplastics for films, fibers and articles prepared by injection molding, compression molding or blow molding. These polymers are useful in the production of load-bearing parts in the automotive industry, in the production of packaging materials in the food and beverage industry and as construction and building material. The polymeric materials are useful alone or in combination with other conventional blending materials.

The polymers of the invention are additionally useful because of the nature and types of components of the polymer backbone. As in all polyketone polymers, the regularly occurring carbonyl group affords amine, alcohol, thiol and other derivatives. Due to the presence in the polymer of functional groups containing carbon-carbon double bonds, additional derivatives can be made by addition chemistry.

The invention will now be further illustrated with the aid of the following examples.

ILLUSTRATIVE EMBODIMENT I

A carbon monoxide/ethylene/butadiene terpolymer was prepared by charging to a magnetically stirred autoclave of 250 ml capacity, a catalyst composition solution comprising 50 ml of methanol, 0.1 mmol of palladium acetate, 2 mmol of trifluoroacetic acid, and 0.15 mmol of 1,3-bis[di(2-methoxyphenyl)phosphino)-propane. After evacuation of air present in the autoclave, 7 ml of liquid butadiene was introduced. Then carbon monoxide was introduced under pressure until a pressure of 25 bar was reached, and subsequently ethylene under pressure was added until a total pressure of 50 bar was reached. The contents of the autoclave were heated and maintained at 110° C. After 10 hours the polymerization was terminated by cooling to room temperature and releasing pressure. The polymer was filtered, washed with methanol and dried in vacuo at room temperature.

The product, 1.0 g of terpolymer, was found to contain an average of 140 of the —(C=O)—(C$_2$H$_4$)— units for each of the —(C=O)—(C$_4$H$_6$)— units.

ILLUSTRATIVE EMBODIMENT II

The procedure of Illustrative Embodiment I was repeated except that (a) the catalyst solution contained 2 mmol of tartaric acid instead of trifluoroacetic acid, and (b) the reaction temperature was 100° C.

The product, 1.0 g of terpolymer, was found to contain an average of 90 of the —(C=O)—(C$_2$H$_4$)— units for each of the —(C=O)—(C$_4$H$_6$)— units.

ILLUSTRATIVE EMBODIMENT III

A carbon monoxide/ethylene/butadiene terpolymer was prepared by charging to a magnetically stirred autoclave of 250 ml capacity, a catalyst composition solution comprising 50 ml of methanol, 0.1 mmol of palladium acetate, 1 mmol of para-toluenesulfonic acid, 3 mmol of 2,2'-bipyridine, and 20 mmol of 1,4-benzoquinone. After evacuation of air present in the autoclave, 7 ml of liquid butadiene was introduced. Then carbon monoxide was introduced under pressure until a pressure of 30 bar was reached, and subsequently ethylene under pressure was added until a total pressure of 50 bar was reached. The contents of the autoclave were heated and maintained at 100° C. After 5 hours the polymerization was terminated by cooling to room temperature and releasing pressure. The polymer was filtered, washed with methanol and dried in vacuo at room temperature.

The product, 1.4 g of terpolymer, was found to contain an average of 21 of the —(C=O)—(C$_2$H$_4$)— units for each of the —(C=O)—(C$_4$H$_6$)— units.

With the aid of $^{13}$C-NMR analysis it was established that the terpolymers prepared according to Illustrative Embodiments I-III had a linear structure. It was further established that the terpolymers were made up of the units —(C=O)—(C$_2$H$_4$)— and units of the formula —(C=O)—(C$_4$H$_6$)— and that the units occurred randomly within the polymer.

What is claimed is:

1. The process of producing a linear, alternating polymer by polymerizing carbon monoxide, at least one α-olefin, and at least one conjugated diene, in the presence of a catalyst composition formed by contacting a palladium compound, the anion of an acid having a pKa less than 6, and a bidentate ligand of phosphorus or nitrogen.

2. The process of claim 1 wherein carbon monoxide is polymerized with ethylene and butadiene.

3. The process of claim 1 wherein the bidentate ligand is a phosphorus bidentate ligand of the formula

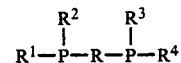

wherein R$^1$, R$^2$, R$^3$ and R$^4$ independently are polar substituted hydrocarbyl groups or hydrocarbyl groups with at least one of R$^1$, R$^2$, R$^3$ and R$^4$ having the polar substitution, and R has at least two carbon atoms in the phosphorus-phosphorus bridge.

4. The process of claim 3 wherein the polar groups are methoxy groups.

5. The process of claim 4 wherein the bidentate phosphorus ligand is 1,3-bis[di(2-methoxyphenyl)phosphino]propane.

6. The process of claim 1 wherein the anion is an anion of an acid having a pKa less than 4.

7. The process of claim 1 wherein the anion is an anion of an acid having a pKa less than 2.

8. The process of claim 7 wherein the acid having a pKa less than 2 is trifluoroacetic acid.

9. The process of claim 1 wherein the bidentate ligand is a bidentate nitrogen ligand having the formula

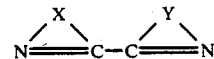

wherein X and Y independently are bridging groups of from 2 to 10 carbon atoms inclusive with from 3 to 4 atoms in the bridge, at least two of which are carbon atoms with any other atoms in the bridge being nitrogen atoms.

10. The process of claim 9 wherein the bidentate nitrogen ligand is a 2,2'-bipyridene or a 1,10-phenanthroline.

11. The process of claim 10 wherein the bidentate nitrogen ligand is 2,2'-bipyridene.

12. The process of claim 9 wherein the anion of the acid is an anion of an acid having a pKa less than 4.

13. The process of claim 9 wherein the anion of the acid is an anion of an acid having a pKa less than 2.

14. The process of claim 9 wherein the anion is the anion of para-toluenesulfonic acid.

15. Linear alternating polymer of carbon monoxide with other monomers, said polymer having olefinically unsaturated double bonds promoting crosslinking or further chemical modification by addition reactions at the double bonds and consisting essentially of:

first units of the formula —(C=O)—(A)— wherein A is a polymer unit which derives from one or more alpha-olefins;

second units of the formula —(C=O)—(B)— where B is a polymer unit having a mono-olefinically unsaturated functional group which derives from one or more conjugated dienes; and the first and second units being randomly distributed with fewer than 1000 of the first units being present on the average for each second unit that is present.

16. The polymer of claim 15 wherein A derives from ethylene.

17. The polymer of claim 16 wherein B derives from butadiene.

18. The polymer of claim 17 wherein fewer than 750 and greater than or equal to one of the first units are present for each second unit.

19. The polymer of claim 17 wherein fewer than 500 and greater than or equal to one of the first units are present for each second unit.

20. The polymer of claim 17 wherein 21 to 140 of the first units are present for each second unit.

* * * * *